United States Patent [19]

Taylor

[11] Patent Number: 5,570,923
[45] Date of Patent: Nov. 5, 1996

[54] TRUCK CAP WINDOW WIPER SYSTEM

[76] Inventor: Bruce D. Taylor, 6064 Carversville Rd., Doylestown, Pa. 18901

[21] Appl. No.: 410,752

[22] Filed: Mar. 27, 1995

[51] Int. Cl.⁶ .............................. B60P 3/345; B60S 1/16; B60S 1/46; B60S 1/58
[52] U.S. Cl. ................ 296/164; 15/250.04; 15/250.3; 15/250.31; 15/250.19
[58] Field of Search ............................ 15/250.34, 250.3, 15/250.31, 250.19, 250.01, 250.16; 296/106, 96.2, 156, 146.8, 96.15, 96.17, 164, 56

[56] References Cited

U.S. PATENT DOCUMENTS

| | | | |
|---|---|---|---|
| D. 330,696 | 11/1992 | Alain | D12/155 |
| 1,301,609 | 4/1919 | Scott | 15/250.3 |
| 1,973,071 | 9/1934 | Hilton | 15/250.31 |
| 2,046,108 | 6/1936 | Drew | 15/250.3 |
| 2,505,078 | 4/1950 | Allen | 15/250.31 |
| 3,019,468 | 2/1962 | Hatch | 15/250.19 |
| 3,026,555 | 3/1962 | Dudley | 15/250.31 |
| 3,670,353 | 6/1972 | Gute et al. | 15/250.1 |
| 3,855,662 | 12/1974 | Fortin | 15/250.29 |
| 4,144,614 | 3/1979 | Barbee | 15/250.19 |
| 4,266,315 | 5/1981 | Skahill | 15/250.19 |
| 4,310,943 | 1/1982 | Palma | 15/250.19 |
| 4,353,111 | 10/1982 | Gallitzendorfer et al. | 296/146.8 |
| 4,496,185 | 1/1985 | McGaughey et al. | 296/146.8 |
| 4,516,288 | 5/1985 | Fizyta et al. | 15/250.04 |
| 4,566,146 | 1/1986 | Harbison | 15/250.34 |
| 4,675,933 | 6/1987 | Martin, Jr. | 15/250.3 |
| 4,763,381 | 8/1988 | Williams | 15/250.01 |
| 5,090,082 | 2/1992 | Alber et al. | 15/250.001 |
| 5,150,497 | 9/1992 | Preik | 15/250.1 |

FOREIGN PATENT DOCUMENTS

| | | | |
|---|---|---|---|
| 792968 | 11/1935 | France | 15/250.31 |
| 841121 | 2/1939 | France | 15/250.31 |
| 842355 | 3/1939 | France | 15/250.31 |
| 355521 | 8/1931 | United Kingdom | 15/250.31 |

*Primary Examiner*—Gary K. Graham
*Attorney, Agent, or Firm*—Dickstein Shapiro Morin & Oshinsky LLP

[57] ABSTRACT

A truck cap window wiper system is disclosed for a truck cap having a glass pane within a window frame. The truck cap is mounted above a truck bed and a tailgate. The glass pane is movable between an open position and a closed position. The window wiper means is for wiping the glass window. The window wiper means is adapted for oscillatory movement against the glass pane. The drive means is mountable to one of the glass pane, the window frame, the tailgate and the truck cap for providing a source of drive power to the wiper means. Engaging means are provided for transmitting the drive power provided by the drive means to the wiper means. Biasing means are provided for resiliently biasing the wiper means towards the drive means and towards the glass pane. The wiper means are selectively movable between an engaged position where the wiper means are engaged with the engaging means so as to maintain the wiper means in contact with the glass pane and a parked position where the wiper means are disengaged from the engaging means so as to permit the glass pane to be moved from the closed position to the open position.

12 Claims, 7 Drawing Sheets

TRUCK CAP WINDOW WIPER SYSTEM

FIELD OF THE INVENTION

The present invention relates generally to windshield wiper systems, and more particularly to truck cap window wiper systems capable of being retrofitting to a truck cap or similar applications such as retrofitting to a rear hatch or door of a pickup truck. Additional applications include the installation of the window wiper system as original equipment in the aforementioned applications.

BACKGROUND TO THE INVENTION

Many pickup trucks are fitted with a cover or cap which has a window on the rear. The cap covers the bed of the pickup truck. The window is generally hinged at the top and has a retaining device to hold the window in an open position. The window may also be of the drop glass type, i.e., where the glass may be retracted within the body or door panel of the vehicle to open the window and many be extended into the window opening to close the window. In many instances, it is desirable that a windshield wiper unit be utilized to wipe and clean the rear window when the window is in a closed position. This is because the rear window has a tendency to become deposited with contaminants and rain water that obscure the rear field of vision.

It is also desirable that the rear window be able to be opened despite the presence of the windshield wiper. This can be accomplished by parking the wiper blade in a parked position where it is out of contact with the window. Certain prior devices have provided a windshield wiper, which when in a parked position off the window, does not obstruct the opening of the rear window. Two such devices are disclosed in U.S. Pat. Nos. 3,019,468 and 3,670,353. In both of these patents, the wipers are guided from an operative position on the window to a parked position off the window and onto the frame. The cam or ramp is necessary because the window glass is frequently recessed relative to the frame to provide a space into which a molded air and liquid seal is fitted. As a consequence, any wiper system fitted to such a window must be capable of movement with two degrees of freedom, i.e., through the dimension of recess or hinge and through the wipe pattern on the glass surface. With the wiper off the window, the window can be opened.

Furthermore, it is desirable that because of the large number of existing truck caps that do not have rear windshield wiper systems that are already in existence, that a new wiper system be retrofitable on the vast majority of existing truck caps. One problem encountered in the retrofit of such windshield wiper systems is that the hinge(s) which attach the window to the frame, or the recess, frequently interfere with the movement of wiper blade onto the frame of the truck cap as might integral rain gutters or sealing mechanisms or the like. Therefore, it is highly desirable that the windshield wiper be able to be moved to a parked position despite the existence of hinges which protrude outwardly beyond the rear window or despite the existence of the recess. It is also important that such a device, in order to be retrofitable, be able to accommodate various truck cap geometries.

It is also desirable to mount the window wiper system through the glass pane or through the window frame such that the window wiper and motor are movable along with the glass pane.

OBJECTS AND SUMMARY OF THE INVENTIONS

It is, therefore, an object of the present invention to provide a window wiper system which eliminates or obviates the above mentioned problems.

It is another object to the present invention to provide a window wiper system capable of being retrofitted to existing truck caps and able to accommodate the geometry of the existing truck cap and window seal and/or hinge.

It is another object of the present invention to provide a window wiper system which is selectively movable from an operative position on the rear window of the truck cap to a parked position off the window so as to enable the window to be moved to and from an open position and a closed position.

It is yet another object of the present invention to provide a window wiper system which can be mounted through a glass pane or through the window frame.

It is yet another object of the present invention to provide a window wiper system which is simple in construction, effective in use and economical to manufacture.

These objects are achieved by providing a truck cap window wiper system having a glass pane, the glass pane being moveable between an open position and a closed position. Window wiper means are provided for wiping the glass window. The window wiper means are adapted for oscillatory movement against the glass pane. Drive means are provided which are mountable to the truck cap for providing a source of drive power to the wiper means. Engaging means are provided for transmitting the drive power provided by the drive means to the wiper means. Biasing means are provided for resiliently biasing the wiper means towards the drive means. The wiper means are selectively moveable between an engaged position where the wiper means are engaged with the engaging means so as to maintain the wiper means in contact with the glass pane and a parked position where the wiper means are disengaged from the engaging means so as to permit the glass pane to be moved from a closed position to an open position.

These and other objects of the present invention will become apparent from the following detailed description and appended claims.

The invention may best be understood with reference to the accompanying drawings wherein presently preferred illustrative embodiments are shown.

3

DETAILED DESCRIPTION OF THE INVENTION

Figure 1:
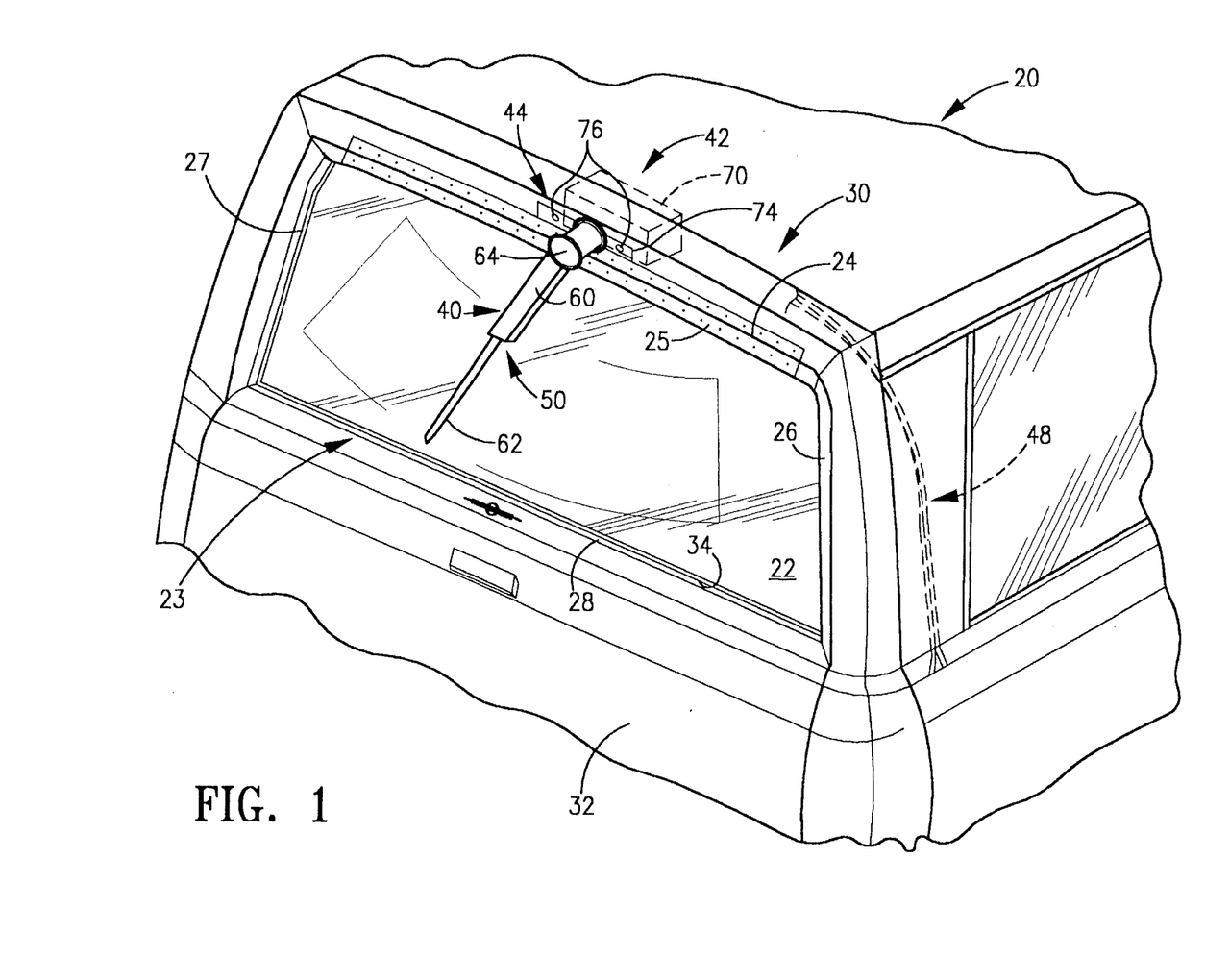
FIG. 1 is a fragmentary perspective view of a truck cap having a truck cap window wiper system installed thereon according to a first embodiment of the present invention showing the wiper in an engaged operative position.

Referring first to FIG. 1, there is shown therein a truck cap window wiper system which is constructed in accordance with the principles of the present invention. For convenience, the truck cap window wiper system will be described in relation to the orientation described in FIG. 2, and consequently terms such as "above" "upwardly," and "bottom" etc., are as used herein are to be construed in the relative sense.

A truck cap, generally indicated at 20, is mounted on the rear over the bed on a pick-up truck. Truck cap 20 would generally include a rear window having a glass pane 22 mounted in a truck cap window frame 23 by a hinge 24 for hinged movement relative thereto. Window frame assembly 23 includes glass pane 22 which has a metal frame mounted onto the peripheral edges thereof. The metal frame includes a top edge 25, right edge 26, left edge 27 and bottom edge 28.

Glass pane 22 could, if used in vehicle where truck cap 20 is integral with the vehicle, alternatively be of the drop glass type where glass pane 22 may be retracted within body or door panel of the vehicle. Hinge 24 is also attached to top edge 25 of window frame assembly 23. Truck cap 20 generally includes an upper truck cap portion, generally indicated as 30, above window frame 23. As will be appreciated by those of skill in the art, the geometry of upper truck cap portion 30 will vary depending on the manufacturer, size of the pick-up, type of bed, etc. The pick-up truck also typically includes a tailgate 32.

Figure 2:
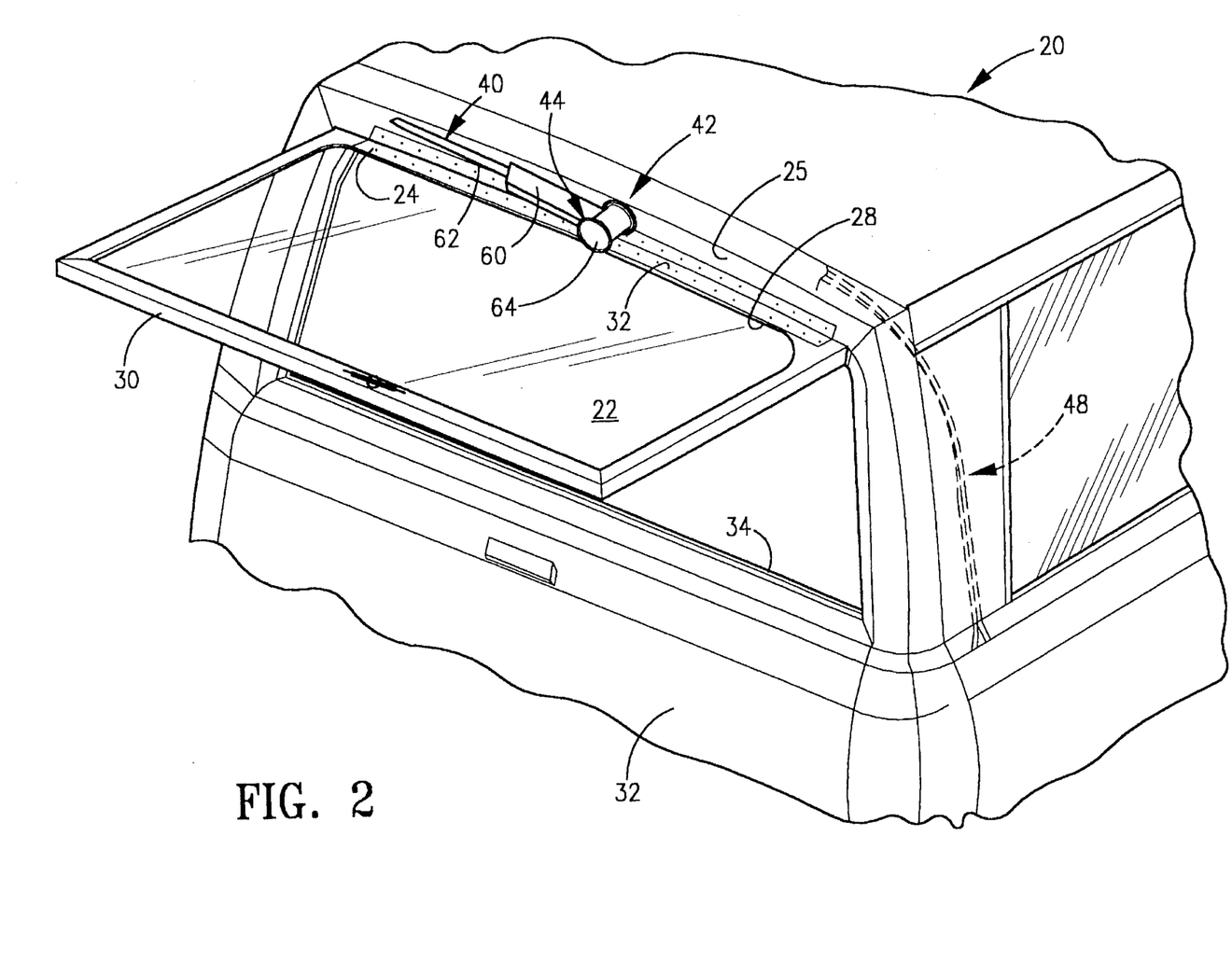
FIG. 2 is a fragmentary perspective view of the truck cap window wiper system of FIG. 1 showing the glass pane in an open position.

Glass pane 22 and window frame 23, as shown in FIGS. 1 and 2, are recessed relative to the surrounding truck cap. Referring now to FIG. 2, it is shown that hinge 24 projects outwardly from the flush surface glass pane 22. As shown in the drawings, the length of the windshield wiper blade may be such that in order to move the windshield wiper from the glass pane to a parked position on the truck cap 20 it may be required that the wiper blade move over the outwardly projecting hinge 24. It can be appreciated that hinge 24 can form an obstruction for moving the windshield wiper from an operative position on glass pane 22 to a parked position on upper portion truck cap frame 25. It can also be appreciated that window frame 23 can form an obstruction for movement of the wiper blade from an operative position on glass pane 22 to a parked position on window frame 23 as shown in FIG. 2 when glass pane 22 is recessed. Alternatively, glass pane 22 may be of the drop glass type commonly used in station wagons (not shown). In the drop glass type, glass pane 22 is usually recessed relative to the surrounding surfaces and a window wiper installed thereon would also be obstructed from moving from a position on the glass pane to a position off of the glass pane thereby allowing the glass pane to be dropped into the tailgate of the station wagon.

Figures 3, 4, 5:
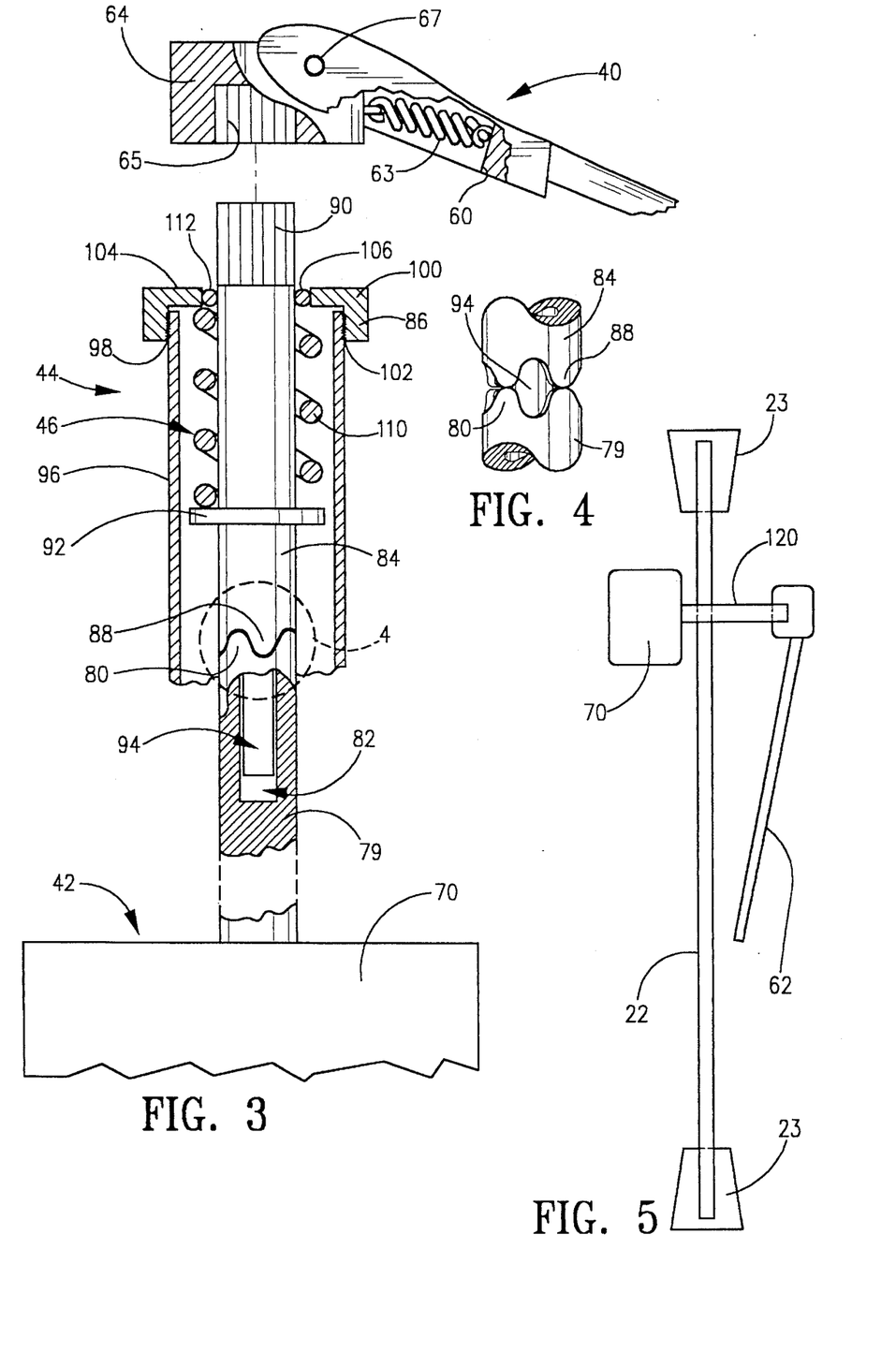
FIG. 3 is an exploded fragmentary cross-sectional view of the truck cap window wiper system showing the motor and drive shaft in an engaged position engaged with the engaging member through undulating ends, a spring biasing the engaging member towards the motor, and a spline end of the engaging member for engagement with a mating spline portion of the wiper assembly.
FIG. 4 is a view of the circled area labeled FIG. 4 in FIG. 3, showing the undulating portions of motor drive shaft and the engaging member in an extended inoperative position.
FIG. 5 is a side cross sectional view of an alternative version of the present invention in which the motor shaft is mounted through the glass pane.

Referring now to FIGS. 1 and 3, the truck cap window wiper system includes window wiper means 40, drive means 42, engaging means 44, biasing means 46, washing fluid reservoir means 48, and nozzle means 50. As shown in a first embodiment in FIG. 1, window wiper means 40 are mounted to drive means 42 above glass pane 22. It should be understood that an existing truck cap 20 will require modification, i.e., holes, mounting brackets, etc. to accommodate the truck cap window wiper system of the present invention.

As shown in FIG. 1, wiper means 40 includes a wiper holder 60 which holds a conventional wiper blade 62 on one end and which is attached at the other end to an engaging portion 64. Wiper holder 60 may be of any configuration capable of holding wiper blade 62 and attachable to engaging portion 64. As shown in FIG. 3, engaging portion 64 defines a mating portion 65 which is a female spline. Wiper holder 60 is suitably attached to engaging portion 64 and extends downwardly therefrom as does wiper blade 62. The wiper holder 60 pivots on a pin 67. Pivoting of the wiper holder 60 away from the window 22, or in the direction the window 22 moves from a closed position to an open position, stretches a spring 63, which, as in conventional windshield wiper systems, is sized to provide an appropriate force on window pane 22 for wiping and allowing for the wiper holder 60 to be pivoted away from the window.

Drive means 42 includes a conventional motor 70 which is mounted to an upper interior section of truck cap 20 by any suitable means. Motor 70 derives electrical energy from the vehicle electrical system via a pair of wires 72 (not shown). Motor 70 is operable by the driver from the passenger compartment. As illustrated in FIG. 1, front plate 74 is mounted to upper truck cap portion 25 on the exterior of truck cap 70. A pair of screws 76 extend through openings formed in truck cap 20 and through front plate 74 and are threadedly engaged with motor 70. A seal (not shown), of conventional design, may be used to seal the opening formed in truck cap 20.

As shown in FIG. 3, motor 70 includes a drive portion 79 which may be of conventional design or may be specially adapted for the present invention. Drive portion 79 extends rearwardly from motor 70 into an opening 78 formed in upper truck cap portion 25 for transmitting torque generated by motor 70 to engaging means 44 as described in greater detail below. Drive portion 79 has undulating end 80 and a recess 82 extending inwardly therefrom for a portion of the length of drive portion 79.

Referring now to FIG. 3, engaging means 44 includes an engaging member 84 and a threaded cap 86. Engaging member 84 is an elongated shaft having an undulating end 88 which mates with undulating end 80 of drive shaft 79. It should be understood that the mating undulating shapes of ends 80 and 88 form a joint that should be of a shape capable of transmitting torque therethrough. The undulating shape is preferable as this shape permits the joint to act as a clutch in the event that wiper blade 60 encounters an obstruction such as ice, etc. thereby preventing damage to motor 70. Ends 80 and 88 could also be other shapes such as keyed slots capable of transmitting torque which would not act as a clutch.

Engaging member 84 has a male spline end 90 opposite from end 88 which mates with female spline 65 of wiper engaging portion 64. An annular shoulder 92 is formed in a central portion of member 84. Extending outwardly from end 88 is projecting portion 94. An outer member 96 is attached to an outer surface of the truck cap on one end thereof and has external threads 98 formed on an opposite end thereof. Threaded cap 86 has a cylindrical portion 100 having internal threads 102 for threaded engagement with threads 98 of outer member 96. Extending inwardly from cylindrical portion 100 is a flat cap portion 104 having a hole 106 extending therethrough.

Biasing means 46, as shown in FIG. 3, includes an extension spring 110 in abutting engagement with shoulder 92 and flat cap portion 104. Spring 110 must be sufficiently strong to bias engaging means 44 and wiper means 40 towards drive portion 79 yet have a low enough spring rate that it can be manually extended or rotated to an extended position thereby disengaging end 88 from end 80 as shown in FIG. 4. As shown in FIG. 4, ends 80 and 88 each have undulating projections thereby allowing rotation of end 88 relative to end 80 of 90° and 180° while being able to maintain engaging member 84 in an extended position as explained in greater detail below. Projecting portion 94 which extends into recess 82 keeps member 84 and drive portion 79 coaxial with one another thereby permitting movement to and from the engaged position and extended position.

As shown in FIG. 3, a conventional seal 112 is disposed between cap 86 and engaging member 84 thereby preventing contaminants and moisture from entering the assembly.

The window wiper system is installed to the truck cap as follows. A hole is formed in either glass pane 22 or truck cap 20. If the hole is formed in the glass pane, then the glass pane must be untempered glass or the hole must be formed in the glass prior to tempering. Drive portion 79 is inserted into the hole and motor 70 is suitably secured to truck cap 20. Outer member 96 is suitably secured to upper portion 25. End 88 of engaging member 84 is engaged with end 80 of drive portion 79. The ability to adjust the length of engaging member 84 permits the present invention to accommodate various thicknesses and geometries of truck cap 20. Spring 110 has one end placed against shoulder 92 and then cap 86 is threaded onto outer member 96. Seal 112 contacts cap 86 and engaging member 84. Spline portion 90 extends through hole 106 and extends outwardly beyond cap 86. Female spline 65 of wiper engaging portion 64 is then engaged with male spline end 90 and wiper blade 60 placed in an operative position. Engaging portion 64 can be rotated 90° to move wiper 60 into an inoperative position off of glass pane 22. Alternatively, outer member 96 can be secured to motor 70 in any suitable fashion such that the window wiper system can be installed as a preassembled unit.

Figure 6:
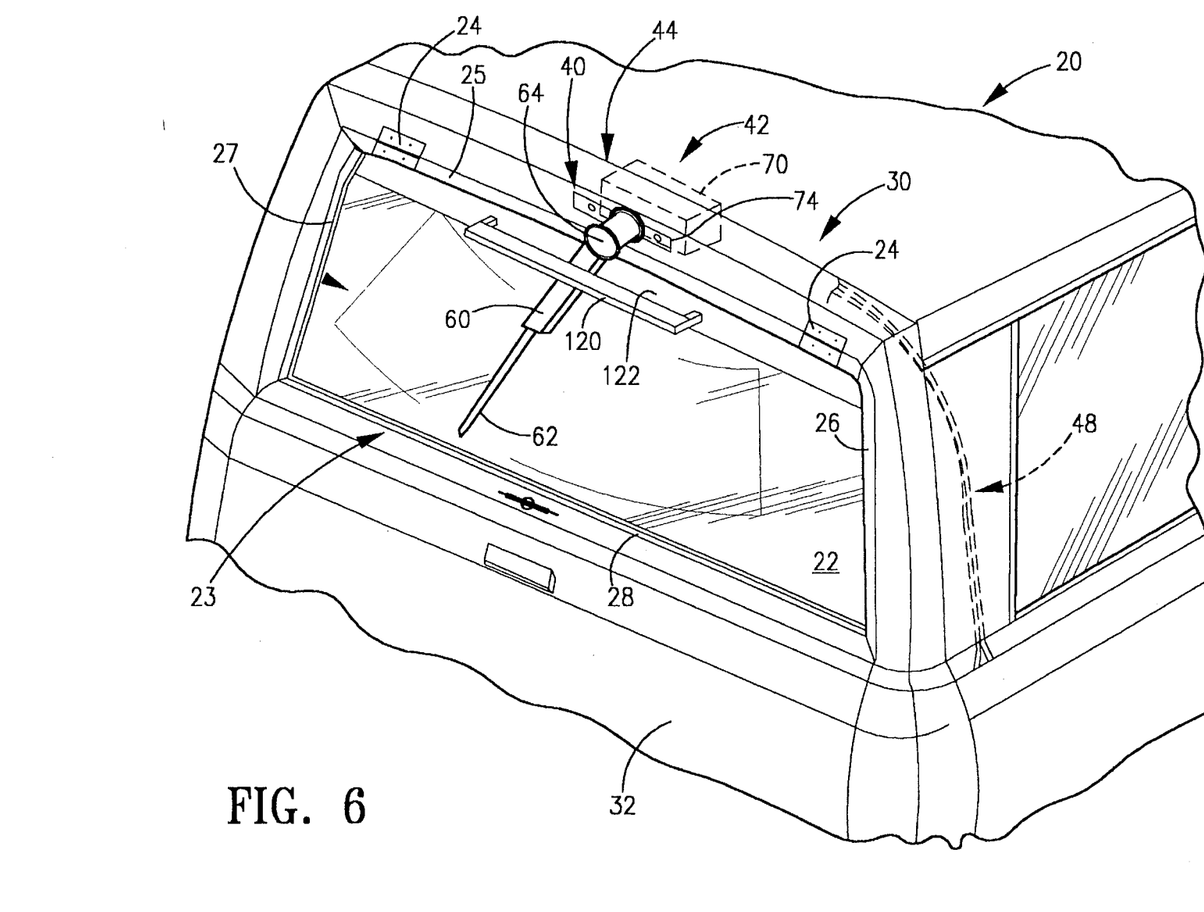
FIG. 6 is a fragmentary perspective view of a second embodiment of the present invention showing a rod member attached to the glass pane

Refer now to FIG. 6 where an alternative version of the window wiper system is shown. In this version motor 70 is provided with a solid shaft 130 having a splined end 90. Solid shaft 90 is mounted through a hole provided in glass pane 22 as described previously. Alternatively, solid shaft maybe mounted through top edge 25 or bottom edge 28.

A third embodiment is illustrated in FIG. 6 wherein a rod member 120 of elongated shape is attached to glass pane 22 on an upper portion thereof or to the window frame 23. Glass pane 22 may be reinforced by a metal covering on an upper portion. Rod member 120 should be disposed below the center of hinge 24. Rod member 120 extends parallel to the plane of glass pane 22 and is attached thereto on either side of drive means 42.

In the third embodiment, a gap 122 is defined between glass pane 22 and rod member 120. Wiper holder 62 extends through this gap. Movement of glass pane 22 to or from a closed position to an open position (shown in FIG. 6) causes concurrent movement of wiper holder 62 and wiper blade 64. It should be appreciated that this embodiment is only operable with the hinged type of rear window wherein drive means 42 is disposed above the rear window.

Figure 7:
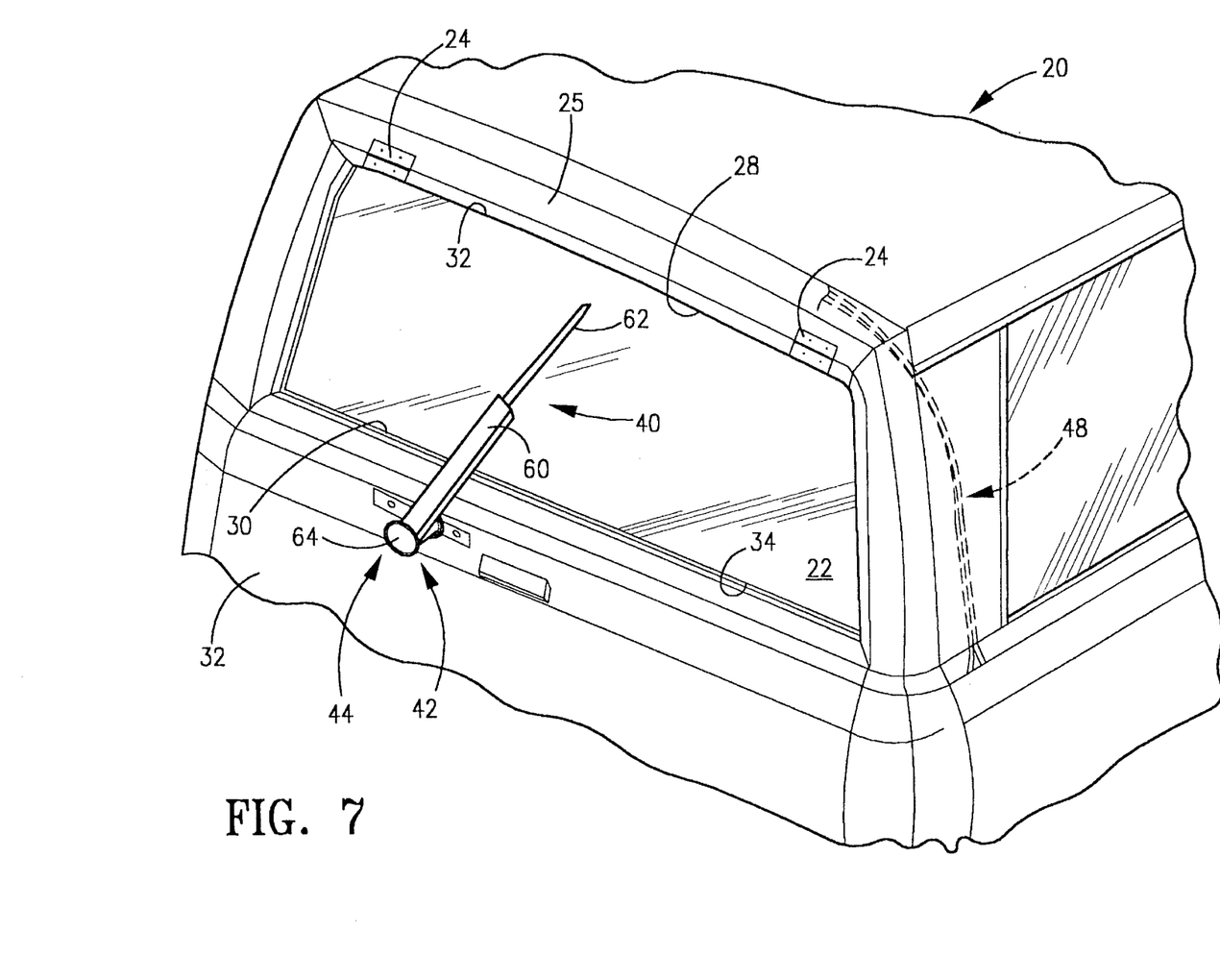
FIG. 7 is a fragmentary perspective view of the truck cap window wiper system according to a third embodiment of the present invention showing the truck cap window wiper system mounted to the tail gate of the pickup truck.

A fourth embodiment is illustrated in FIG. 7 wherein drive means 42 is disposed below glass pane 22 within tailgate 26. In this embodiment, the window wiper system could be factory installed in the tailgate as original equipment. A complete discussion of this embodiment is not provided herein as it is believed that the discussion provided above is sufficient to enable one of ordinary skill in the art to understand the invention. It is also possible to mount the window wiper system through the window frame as well.

Figure 8:
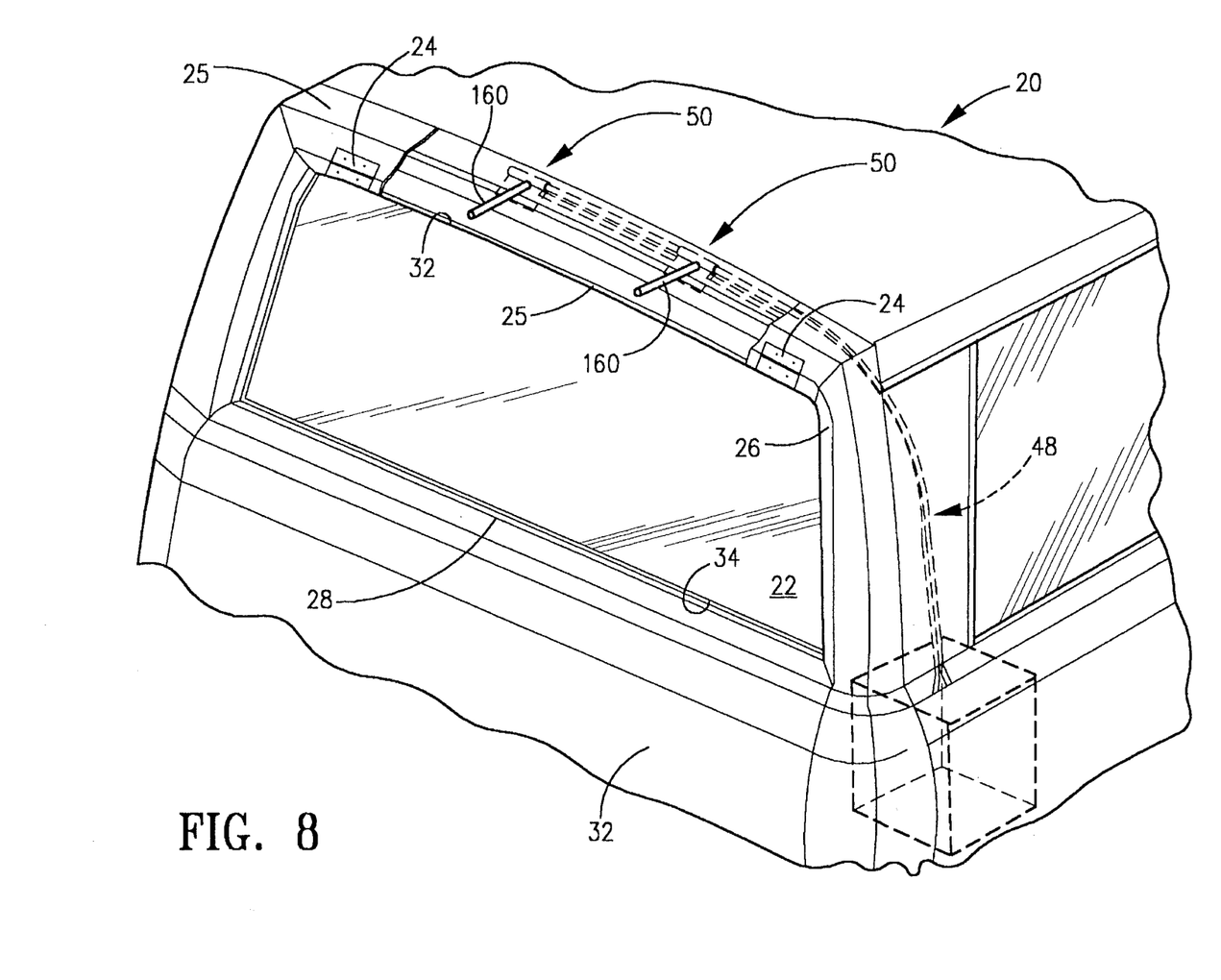
FIG. 8 is a fragmentary perspective view with portions broken away of the truck cap window wiper system showing nozzles mounted to a top frame portion of the truck cap.

Washer fluid reservoir means 48 is best illustrated in FIG. 8 where a pressurized washer fluid reservoir 150 or reservoir with pump is disposed in the bed of the pick-up truck under truck cap 20. Washer fluid reservoir 150 is connected by tubing 152 to nozzle means 50 illustrated in FIGS. 1 and 8. Nozzle means 50 may take the form of upper nozzles 160 located in upper portion of truck cap 20 indicated in FIG. 10 or may be located on wiper means 40 as shown in FIG. 1.

In operation, engaging portion 64 will normally be engaged with drive portion 79 in an operative engaged position. In this engaged position, wiper blade 62 is in contact with glass pane 22 and drive power supplied by motor 70 causes wiper blade 62 to move in an oscillatory pattern for wiping glass pane 22. When it becomes necessary to open the rear window, engaging portion 64 can be manually grasped and pulled outwardly in a direction away from drive portion 79 and rotated thereby moving wiper blade 62 and wiper holder 60 to the parked position off glass pane 22 as illustrated in FIG. 2. After being rotated the wiper system will be in an inoperative condition. End 88 of engaging portion 64 will be in contact with end 80 but the undulating portions will not be mated together.

In the inoperative condition, the bias of spring 110 maintains wiper blade 64 in contact with upper truck cap portion 25 above glass pane 22. Movement of wiper blade 62 and wiper holder 60 from the parked position to the engaged position requires that wiper holder 62 be rotated until the undulating portions mate together. Spring 110 exerts sufficient force to urge engaging member 80 into engagement with drive portion 79.

Figure 9:
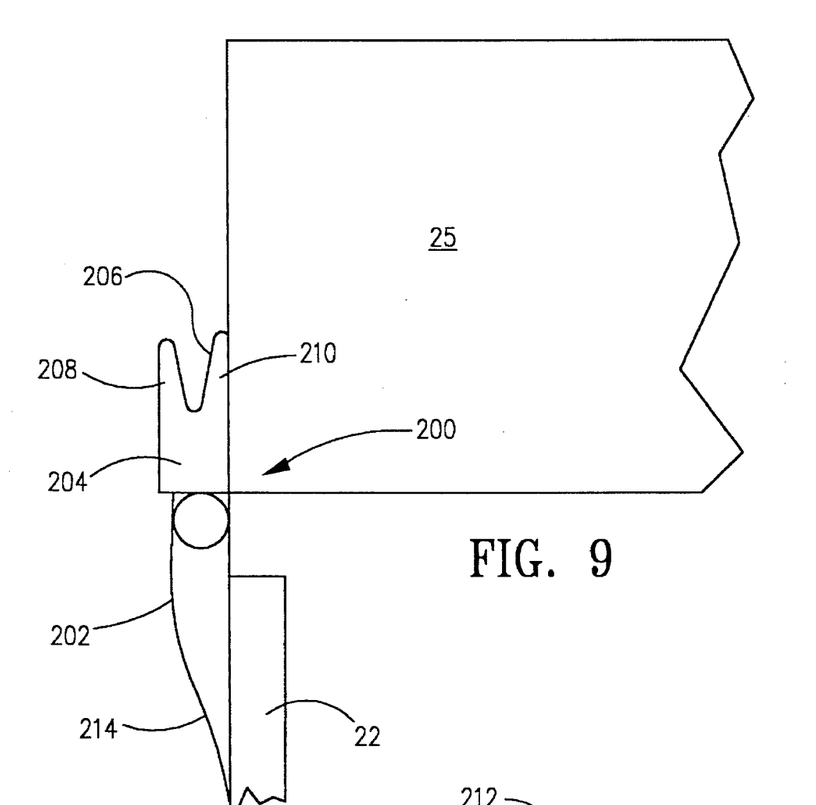
FIG. 9 is a cross-sectional view of a rain gutter which also functions as the hinge attaching the glass pane to the window frame.
Figure 10:
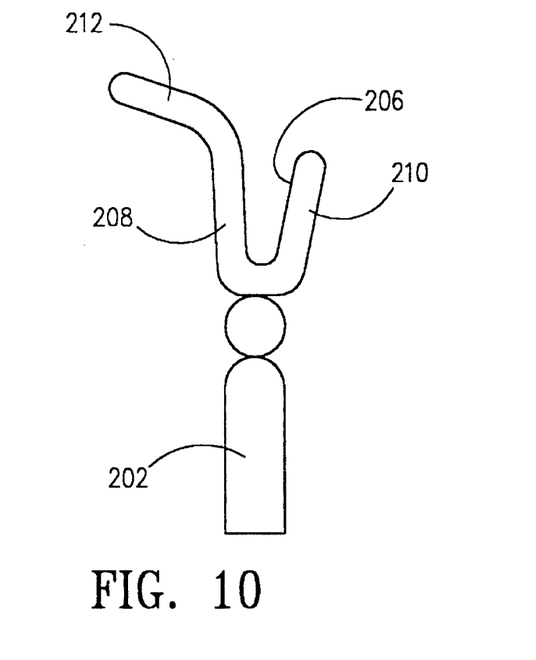
FIG. 10 is a cross-sectional view of the rain gutter of FIG. 9 also including a front lip portion.

As shown in FIG. 9, a cross-sectional view of rain gutter hinge 200 usable with the window wiper system is shown. Rain gutter hinge 200 includes a lower portion 202 hingedly mounted to an upper portion 204. Upper portion 204 includes an upwardly facing recess 206 extending in a longitudinal direction. Recess 206 is formed by a front portion 208 and a rear portion 210. Optionally, as shown in FIG. 10, a front lip 212 is formed on front portion 208 which extends upwardly and outwardly therefrom. Lower portion 202 includes a ramp 214 for guiding wiper blade 62 off of glass pane 22. By indexing of wiper motor 70 wiper 62 can be parked on the ramp without requiring the motor drive shaft to be splined. Rain gutter hinge 200 drains water away from glass pane 22 in the directions of right edge 26 and left edge 27 of window frame assembly 23. Rain gutter hinge 200 is particularly adapted to be used with the window wiper system described above even though front lip 212 forms an obstruction from moving wiper blade 60 from an operative to an inoperative position.

It should now be apparent that a truck cap window wiper system has been described which is retrofitable to existing truck caps and can accommodate various truck cap geometries. It should further be apparent that a truck cap window wiper system has been described as having a movable wiper blade that is manually movable from operative position on the glass pane to an inoperative position on the truck frame with either a hinged window or a recessed window type truck cap.

While this invention has been described as having a preferred design, it is understood that it is capable of further modification, uses and/or adaptations thereof following in general the principles of the invention including such departures that have been within known or customary practice in the art to which the invention pertains.

What is claimed:

1. In a truck cap and window wiper system assembly, said truck cap having a hinged window pane, the truck cap being mounted above a truck bed and the widow pane being movable at the hinge between an open position and a closed position, the wiper system comprising:

window wiper means for wiping the window pane, said wiper means including an engaging portion, a wiper holder pivotally coupled with said engaging portion and a wiper blade coupled with said holder, said window wiper means adapted for oscillatory movement against the window pane;

drive means mountable to the truck cap for providing a source of drive power to said wiper means;

engaging means for selectively transmitting the drive power provided by said drive means to said wiper means;

biasing means for resiliently biasing said engaging means and said wiper means towards said drive means and towards the window pane respectively, said engaging portion coupled to said engaging means;

said engaging means being selectively movable between an engaged position where said engaging means are engaged with said drive means wherein said wiper means in contact with the window pane and a parked position where said engaging means are disengaged from said drive means wherein said wiper means is not in contact with the window pane so as to permit the window pane to be moved from the closed position to the open position without interference of said wiper means.

2. The truck cap and window wiper system assembly according to claim 1, wherein said drive means includes a motor having a drive shaft, said drive shaft having an end having an undulating shape; and wherein said engaging means includes an engaging member having a first end having an undulating shape which mates with said undulating drive shaft end and biased by said biasing means to engage with said drive means, and having a second end engaged with said wiper means; said engaging undulating ends shaped to move out of engagement against said bias when said wiper means is urged independent of said drive means to rotate about said drive shaft, such rotation causing said ends to rotate relative to one another and as a result of said undulating shapes bearing against one another during said rotation, said ends moving out of engagement.

3. The truck cap and wiper system assembly according to claim 2, wherein said undulating end of said engaging member has a projecting portion extending outwardly therefrom and said drive shaft has a recess into which said projecting member extends.

4. The truck cap and wiper system assembly according to claim 1, wherein said biasing means comprises an elongated spring engaged on one end with said engaging member and on another end with a threaded cap.

5. The truck cap and wiper system assembly according to claim 1, further comprising washer fluid reservoir means to provide washer fluid to the wiper system for cleaning the window.

6. The truck cap and wiper system assembly according to claim 1, wherein said wiper means are manually movable from said parked position to said engaged position.

7. The truck cap and wiper system assembly according to claim 1, wherein said wiper means are moved axially away from said engaging means so as to permit said wiper means to be moved from said engaged position to said parked position.

8. The truck cap and wiper system assembly according to claim 1, wherein said wiper means further comprise nozzle means for distributing washer fluid for cleaning the glass pane.

9. A truck cap with window wiper system comprising:

a truck cap having a hinged window pane movable at said hinge in a direction between an open position and a closed position;

a window wiper system including an oscillatory drive motor and a wiper blade coupled with said motor whereby said motor drives said wiper with oscillatory movement to wipe said window;

said system further including a drive assembly mounted to the truck cap, said drive assembly including a drive shaft and an engaging shaft, said drive shaft being turned in an oscillatory manner by said motor, said engaging shaft having a drive end and a wiper end and being mounted to said cap for movement between an engaged position and a disengaged position, a resilient member engages said engaging shaft for resiliently biasing said engaging shaft towards said drive shaft, in said engaged position said drive end being in engagement with said drive shaft and being turned in an oscillatory manner by said drive shaft, and in said disengaged position said drive end being not in engagement with said drive shaft;

said system further including a wiper holder, said wiper blade being mounted to said holder, said holder being pivotally mounted to an engaging portion which is coupled to said wiper end of said engaging shaft.

10. The truck cap as in claim 9 wherein said wiper holder is selectively movable between said engaged position wherein said wiper blade is maintained in contact with said glass pane and a parked position wherein said engaging shaft is held in said disengaged position.

11. The truck cap as in claim 9 wherein said resilient member comprises a first spring mounted to resiliently bias said engaging means in the engaged position and said drive assembly further includes a second spring mounted to resiliently bias said wiper holder towards said window pane.

12. The truck cap as in claim 11 wherein said drive shaft having an end having an undulating shape, and wherein said engaging end of said engaging shaft has an undulating shape which mates with said undulating drive shaft end; said engaging undulating ends shaped to move out of engagement against said bias of said first spring when said engaging shaft is urged independent of said drive shaft to rotate about said drive shaft, such rotation causing said ends to rotate relative to one another and as a result of said undulating shapes bearing against one another during said rotation, said ends moving out of engagement.

* * * * *